(12) United States Patent
Venkatesh et al.

(10) Patent No.: US 10,977,002 B2
(45) Date of Patent: Apr. 13, 2021

(54) SYSTEM AND METHOD FOR SUPPORTING ALTERNATE NUMBER FORMAT FOR EFFICIENT MULTIPLICATION

(71) Applicant: Facebook Technologies, LLC, Menlo Park, CA (US)

(72) Inventors: Ganesh Venkatesh, San Jose, CA (US); Liangzhen Lai, Fremont, CA (US); Pierce I-Jen Chuang, Sunnyvale, CA (US); Meng Li, Union City, CA (US); Vikas Chandra, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 111 days.

(21) Appl. No.: 16/511,085

(22) Filed: Jul. 15, 2019

(65) Prior Publication Data
US 2021/0019115 A1   Jan. 21, 2021

(51) Int. Cl.
*G06F 7/523* (2006.01)
*G06F 5/01* (2006.01)
(Continued)

(52) U.S. Cl.
CPC .............. *G06F 7/5443* (2013.01); *G06F 5/01* (2013.01); *G06F 7/523* (2013.01); *G06F 7/5334* (2013.01); *G06F 7/57* (2013.01)

(58) Field of Classification Search
CPC ......... G06F 7/4876; G06F 7/523–5235; G06F 7/5443; G06F 7/533–5338
See application file for complete search history.

(56) References Cited

U.S. PATENT DOCUMENTS

| | | | | |
|---|---|---|---|---|
| 4,864,529 A | * | 9/1989 | Shah | G06F 7/5334 708/630 |
| 5,119,325 A | * | 6/1992 | Viot | G06F 7/5338 708/628 |

(Continued)

OTHER PUBLICATIONS

A. G. Dempster and M. D. Macleod, "Constant integer multiplication using minimum adders," in IEE Proceedings—Circuits, Devices and Systems, vol. 141, No. 5, pp. 407-413, Oct. 1994 (Year: 1994).*

(Continued)

*Primary Examiner* — Matthew D Sandifer
(74) *Attorney, Agent, or Firm* — Foley & Lardner LLP

(57) ABSTRACT

Disclosed herein includes a system, a method, and a device including shift circuitry and add circuitry for performing multiplication of a first value and a second value for a neural network. The first value has a predetermined format including a first bit, and two or more second bits to represent a value of zero or $2^n$ where n is an integer greater than or equal to 0. The device shifts, when the two or more second bits represent the value of $2^n$, the second value by (n+1) bits via the shift circuitry to provide a first result, selectively outputs zero or the second value, based on a value of the first bit of the first value, to provide a second result, and adds the first result and the second results via the add circuitry to provide a result of the multiplication of the first and second values.

20 Claims, 10 Drawing Sheets

250

When two or more second bits represent a value of $2^n$, shifting, by shift circuitry, a second value by (n+1) bits to provide a first multiplication result
251

↓

Based on a value of a first bit of a first value, selectively outputting zero or the second value to provide a second multiplication result 252

↓

Adding, by add circuitry, the first multiplication result and the second multiplication results to provide a result of multiplication of the first value and the second value 253

(51) Int. Cl.
*G06F 7/533* (2006.01)
*G06F 7/544* (2006.01)
*G06F 7/57* (2006.01)

(56) References Cited

U.S. PATENT DOCUMENTS

2005/0228845 A1* 10/2005 Pius Ng ................ G06F 7/5306
708/627
2009/0228540 A1* 9/2009 Katayama ............ H04N 19/436
708/628

OTHER PUBLICATIONS

International Search Report and Written Opinion on PCT/US2020/041454, dated Sep. 4, 2020 (11 pages).
Philipp Gysel: "Ristretto: Hardware-Oriented Approximation of Convolutional Neural Networks", arxiv.org, Cornell University Library, 201 Olin Library Cornell University Ithaca, NY 14853, May 20, 2016 (May 20, 2016), 74 pages.
Saravanan S et al: "Design of Hybrid Encoded Booth Multiplier with Reduced Switching Activity Technique and low power 0.13A madder for DSP block in wireless sensor node", Wireless Communication and Sensor Computing, 2010. ICWCSC 2010. International Conference on, IEEE, Piscataway, NJ, USA, Jan. 2, 2010 (Jan. 2, 2010), pp. 1-6, XP031630133, ISBN: 978-1-4244-5136-4.
Wang, Zhisheng et al: "Accelerating Recurrent Neural Networks: A Memory-Efficient Approach", IEEE Transactions on Very Large Scale Integration (VLSI) Systems, IEEE Service Center, Piscataway, NJ, USA, vol. 25, No. 10, Oct. 1, 2017 (Oct. 1, 2017), pp. 2763-2775.

* cited by examiner

250

When two or more second bits represent a value of $2^n$, shifting, by shift circuitry, a second value by (n+1) bits to provide a first multiplication result
251

Based on a value of a first bit of a first value, selectively outputting zero or the second value to provide a second multiplication result 252

Adding, by add circuitry, the first multiplication result and the second multiplication results to provide a result of multiplication of the first value and the second value 253

When two or more second bits of a first value represent a value of $2^n$ and two or more second bits of a second value represent a value of $2^m$, shifting, by shift circuitry, a value of $2^{m+1}$ by (n+1) bits to provide a third multiplication result 261

Based on a value of a first bit of the second value, selectively outputting zero or the value of $2^{n+1}$ to provide a fourth multiplication result 262

Based on a value of a first bit of the first value, selectively outputting zero or the value of $2^{m+1}$ to provide a fifth multiplication result 263

Based on the value of the first bit of the first value, selectively outputting zero or a value of a first bit of the second value to provide a sixth multiplication result 264

Adding, by add circuitry, the third to sixth multiplication results to provide a result of the multiplication of the first value and the second value 265

SYSTEM AND METHOD FOR SUPPORTING ALTERNATE NUMBER FORMAT FOR EFFICIENT MULTIPLICATION

FIELD OF DISCLOSURE

The present disclosure is generally related to a system and method for performing a multiplication of values for a neural network, including but not limited to, a system and method for using a number format for efficient multiplication.

BACKGROUND

One challenge in artificial intelligence (AI) accelerators relates to controlling or reducing power consumption in performing AI processing for a neural network. For example, the neural network may be a convolutional neural network which can include convolution layers. In a convolution layer, an AI accelerator can apply a convolution operation to an input layer, passing the result to the next layer in a manner that reduces the number of parameters compared to conventional fully connected feedforward neural network. However, as more and more complex multi-dimensional (e.g., multiple channels) input/output structures are used in a convolutional neural network, ways to reduce energy and latency may be beneficial. Moreover, in view of a significant number of multiplication operations needed in performing convolution operations, efficient multiplication operations may be beneficial.

SUMMARY

Various embodiments disclosed herein are related to a device for performing multiplication of a first value and a second value for a neural network. In some embodiments, the device may include circuitry including shift circuitry and add circuitry. The first value may have a predetermined format including a first bit, and two or more second bits to represent a value of zero or $2^n$ where n is an integer greater than or equal to 0. The circuitry may be configured to shift, when the two or more second bits represent the value of $2^n$, the second value by (n+1) bits via the shift circuitry to provide a first multiplication result. The circuitry may be configured to, based on a value of the first bit of the first value, selectively output zero or the second value to provide a second multiplication result. The circuitry may be configured to add the first multiplication result and the second multiplication result via the add circuitry to provide a result of the multiplication of the first value and the second value.

In some embodiments, the first bit of the first value may be a least significant bit of the first value. In some embodiments, the circuitry may be configured to provide, when the two or more second bits represent the value of zero, the value of zero as the first multiplication result. In some embodiments, the second value may use a linear number format to represent a binary number.

In some embodiments, the second value may have the predetermined format comprising a first bit, and two or more second bits to represent a value of zero or $2^m$ where m is an integer greater than or equal to zero. In some embodiments, the circuitry may be further configured to, when the two or more second bits of the first value represent the value of $2^n$ and the two or more second bits of the second value represent the value of $2^m$, shift the value of $2^{m+1}$ by (n+1) bits via the shift circuitry to provide a third multiplication result. The circuitry may be further configured to, based on a value of the first bit of the second value, selectively output zero or the value of $2^{m+1}$ to provide a fourth multiplication result. The circuitry may be further configured to, based on the value of the first bit of the first value, selectively output zero or the value of $2^{m+1}$ to provide a fifth multiplication result. The circuitry may be further configured to, based on the value of the first bit of the first value, selectively output zero or the value of the first bit of the second value to provide a sixth multiplication result. The circuitry may be further configured to add the third to sixth multiplication results via the add circuitry to provide a result of the multiplication of the first value and the second value.

In some embodiments, "1 1" as the two or more second bits of the first value may represent a value of 4. In some embodiments, the first value may further include a third bit to indicate that the first value is signed or unsigned. In some embodiments, the circuitry may be configured to determine a sign of the result of the multiplication of the first value and the second value based on a value of the third bit of the first value. In some embodiments, the circuitry may be further configured to perform convolution for a first layer of the neural network using weight data and activation data representing an activation function, and the first value may represent a value of one of the weight data and the activation data for the first layer of the neural network. In some embodiments, the second value may represent a value of the other of the weight data and the activation data for the first layer of the neural network.

Various embodiments disclosed herein are related to a method for performing multiplication of a first value and a second value for a neural network, the first value having a predetermined format comprising a first bit, and two or more second bits to represent a value of zero or $2^n$ where n is an integer greater than or equal to 0. In some embodiments, performing the multiplication of the first value and the second value may include, when the two or more second bits represent the value of $2^n$, shifting, by shift circuitry, the second value by (n+1) bits to provide a first multiplication result. Performing the multiplication of the first value and the second value may include, based on a value of the first bit of the first value, selectively outputting zero or the second value to provide a second multiplication result. Performing the multiplication of the first value and the second value may include adding, by add circuitry, the first multiplication result and the second multiplication result to provide a result of the multiplication of the first value and the second value.

In some embodiments, the first bit of the first value may be a least significant bit of the first value. In some embodiments, performing the multiplication of the first value and the second value may include providing, when the two or more second bits represent the value of zero, the value of zero as the first multiplication result. In some embodiments, the second value may use a linear number format to represent a binary number.

In some embodiments, the second value may have the predetermined format comprising a first bit, and two or more second bits to represent a value of zero or $2^m$ wherein m is an integer greater than or equal to zero. Performing the multiplication of the first value and the second value may further include when the two or more second bits of the first value represent the value of $2^n$ and the two or more second bits of the second value represent the value of $2^m$, shifting, by the shift circuitry, the value of $2^{m+1}$ by (n+1) bits to provide a third multiplication result. Performing the multiplication of the first value and the second value may further include based on a value of the first bit of the second value, selectively outputting zero or the value of $2^{n+1}$ to provide a fourth multiplication result. Performing the multiplication of the first value and the second value may further include based on the value of the first bit of the first value, selectively outputting zero or the value of $2^{m+1}$ to provide a fifth multiplication result. Performing the multiplication of the first value and the second value may further include, based on the value of the first bit of the first value, selectively outputting zero or the value of the first bit of the second value to provide a sixth multiplication result. Performing the multiplication of the first value and the second value may further include adding, by the add circuitry, the third to sixth multiplication results to provide a result of the multiplication of the first value and the second value.

In some embodiments, "1 1" as the two or more second bits of the first value may represent a value of 4. In some embodiments, the first value may further include a third bit to indicate that the first value is signed or unsigned. In some embodiments, performing the multiplication of the first value and the second value may further include determining a sign of the result of the multiplication of the first value and the second value based on a value of the third bit of the first value. In some embodiments, convolution for a first layer of the neural network may be performed using weight data and activation data representing an activation function, and the first value may represent a value of one of the weight data and the activation data for the first layer of the neural network. In some embodiments, the second value may represent a value of the other of the weight data and the activation data for the first layer of the neural network.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 2E is a flow chart illustrating a method for performing multiplication using an alternative number format, according to an example implementation of the present disclosure.

FIG. 2F is a flow chart illustrating a method for performing multiplication using an alternative number format, according to another example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for performing multiplication of values using an alternative number format.

A. Environment for Artificial Intelligence Related Processing

Figure 1A:
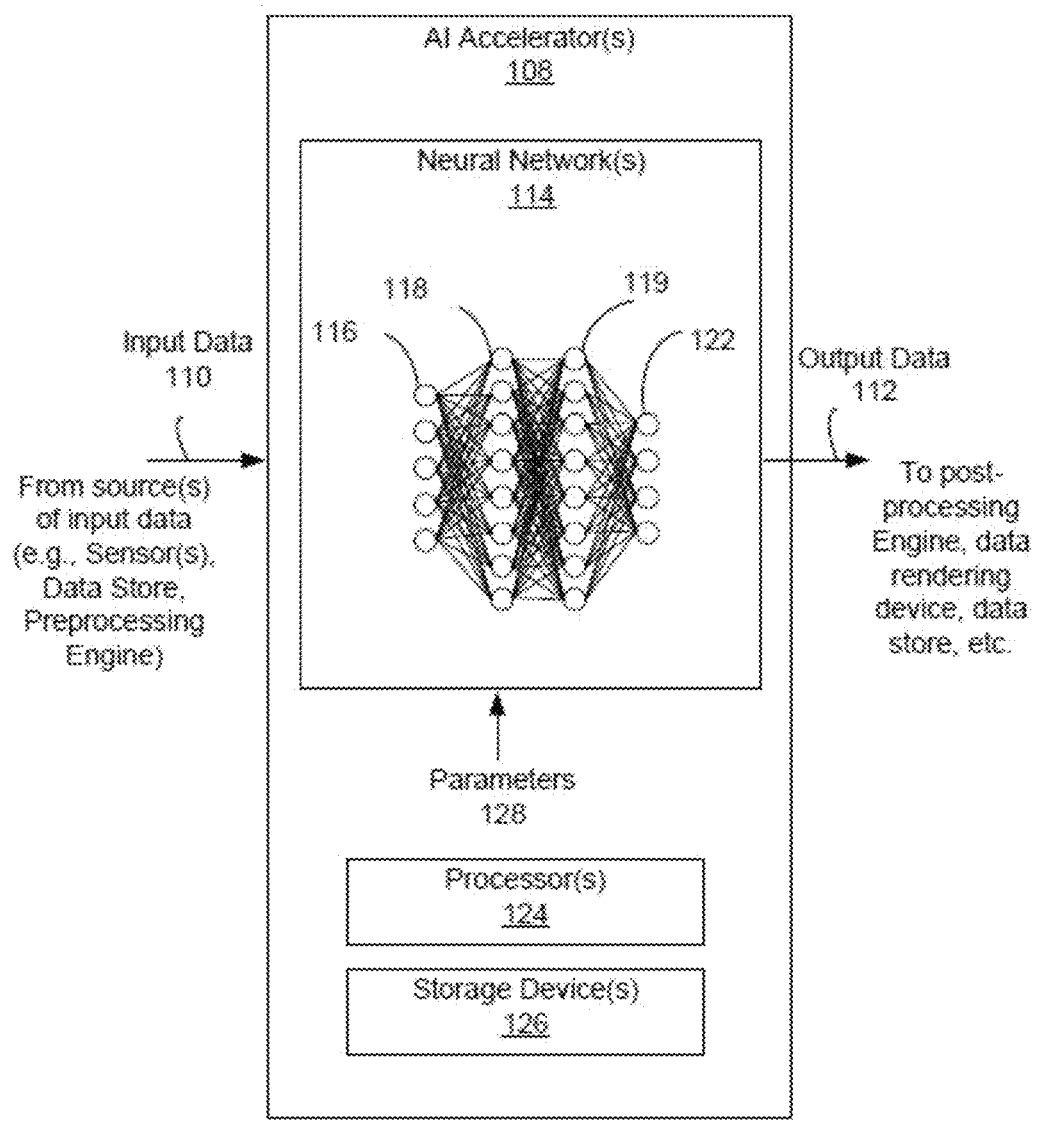
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) 24 and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 114 differently for each neural network 114, or assigning different weights (e.g., hyperparameters, or learning rates), tensor flows, etc. Thus, setting appropriate parameters 128 for the neural network(s) 114 based on a tuning or training process and the objective of the neural network(s) and/or the system, can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically, the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensordriven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
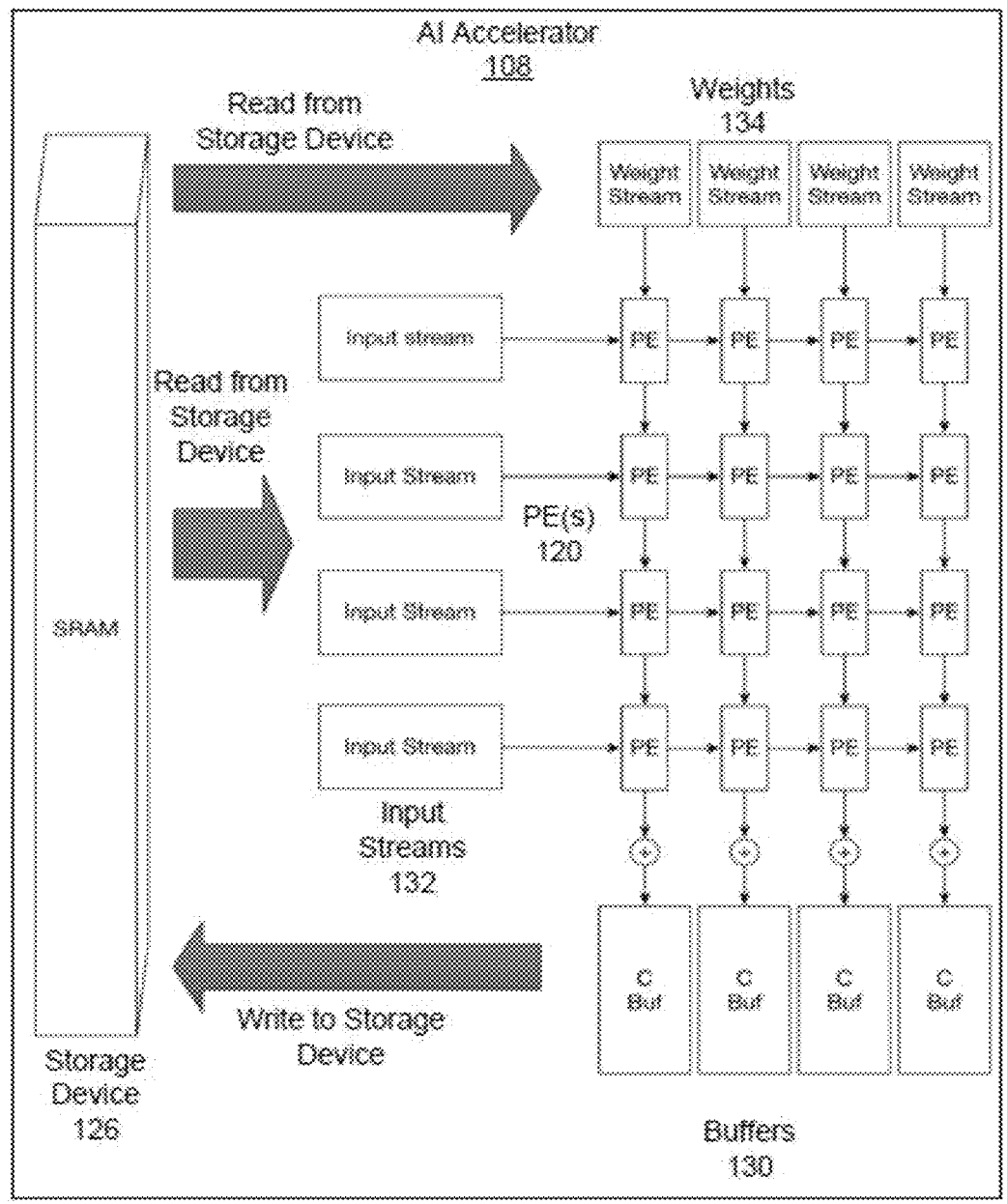
FIG. 1B is a block diagrams of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some neural networks, the output space Y may be as simple as $\{0, 1\}$, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can pass the result downstream for instance. The systolic array can be hard-wired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored by the storage device 126 can be retrieved or read from the storage device 126, and be used as inputs to the array of PEs 120 for processing (of a subsequent layer of the neural network) at a later time. In certain embodiments, the outputs that are stored by the storage device 126 can be retrieved or read from the storage device 126 as output data 112 for the AI accelerator 108.

Figure 1C:
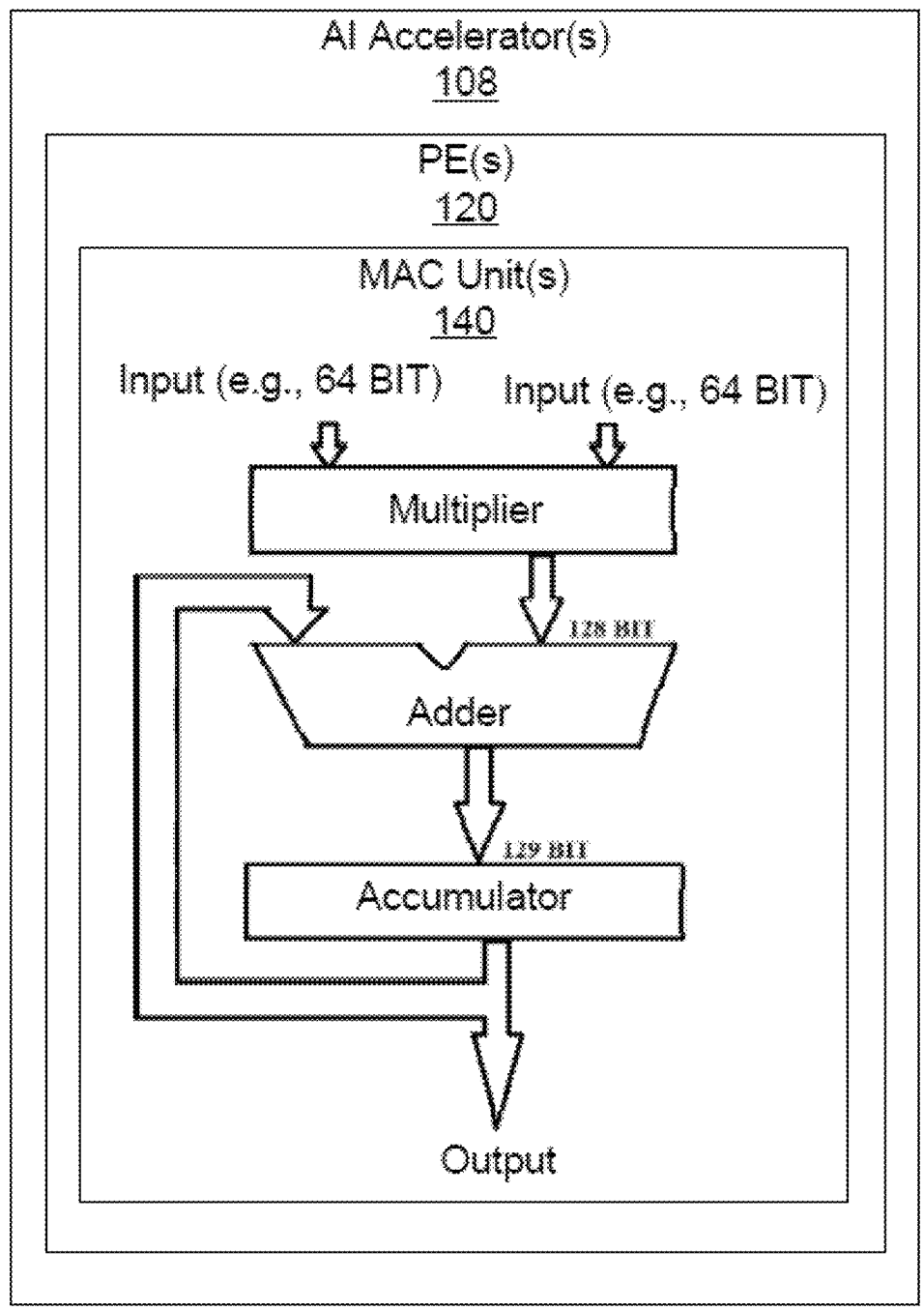
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a+(b \times c) \qquad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the accumulator register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
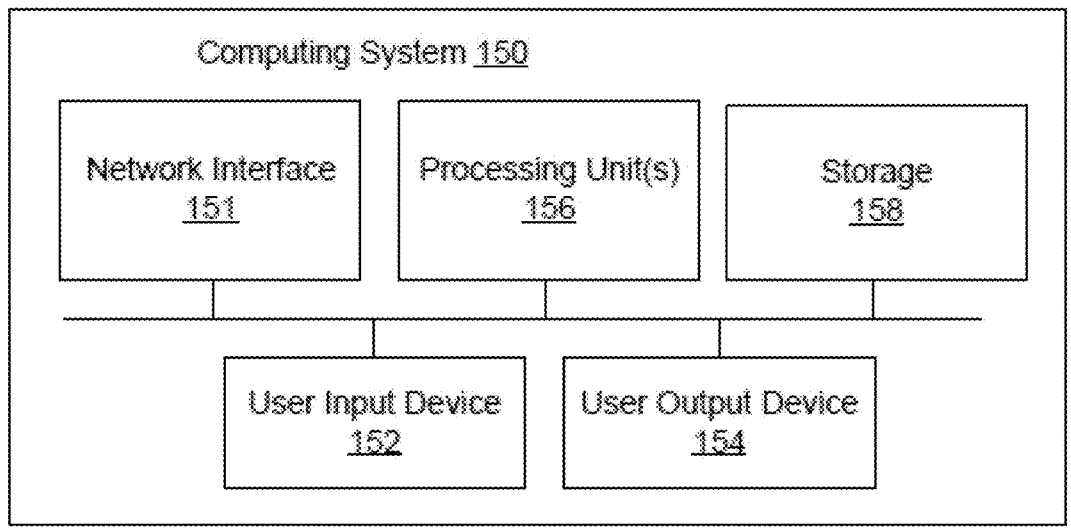
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 (or processors 156) of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. User output devices 154 can be provided in addition to or instead of a display. Examples include indicator lights, speakers, tactile "display" devices, printers, and so on.

Some implementations include electronic components, such as microprocessors, storage and memory that store computer program instructions in a non-transitory computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Methods and Devices for Multiplication of Values Using an Alternative Number Format Disclosed herein include embodiments of a system, a method, and a device for performing a multiplication of values for a neural network, including but not limited to, a system and method for using a number format for efficient multiplication. In some aspect, this disclosure is directed to a technique for representing a number in an alternative format more suitable for energy-efficient multiplication in an AI chip for instance.

In one aspect, a number used in a neural network (e.g., a weight or a value from an activation function which can be determined during training) can be represented as a linear format, e.g., conventional binary number formats such as signed magnitude or 2's complement, etc. However, multiplication of two numbers in such a linear format involves multiplier operation which may consume more energy than adder or shift operations. To address this problem, this disclosure provides a solution to perform multiplication of values using a number format alternative to conventional number formats (hereinafter sometimes referred as "alternative number format") so that multiplication of those values can be performed with more energy efficient operations (e.g., adder or shift operations) instead of a multiplier operation.

In another aspect, the use of the alternative format can reduce the number of partial products in multiplication, thereby further reducing energy and latency. For example, in performing multiplication using the alternative format, in some embodiments, 4-bit data B=(b3 b2 b1 b0) can represent a number b0+2*β(β=$2^n$, n is an integer greater than or equal to 0) instead of b0+2*b1+4*b2 (without consideration of the sign bit b3). If the number represented by B is multiplied by another 4-bit number A, the number of partial products is two (e.g., b0*A+2*β*A) while the number of partial products if B is in the linear number format would be three (e.g., b0*A+2*b1*A+4*b2*A). That is, in multiplication of two 4-bit numbers for instance, this alternative format can reduce the maximum number of partial products (and partial product operations) from 3 to 2 compared to the linear number format.

In further aspect, this alternative number format can incorporate the use of various possible defined sets of numbers or values (e.g., to represents weights for a neural network) and can extend the range of values (e.g., the range represented by "000"~"111" can be extended to 0~9 in some embodiments) while it skips or disallow only a few values (e.g., 6 and 7 are not represented according using the alternative format in some embodiments). For example, 4-bit data "0110" and "0111" represent 8 and 9, respectively, instead of 6 and 7 as represented in a linear format. Thus, this alternative number can extend the range of values while not degrading significantly the performance (e.g., accuracy) of a neural network.

Figure 2A:
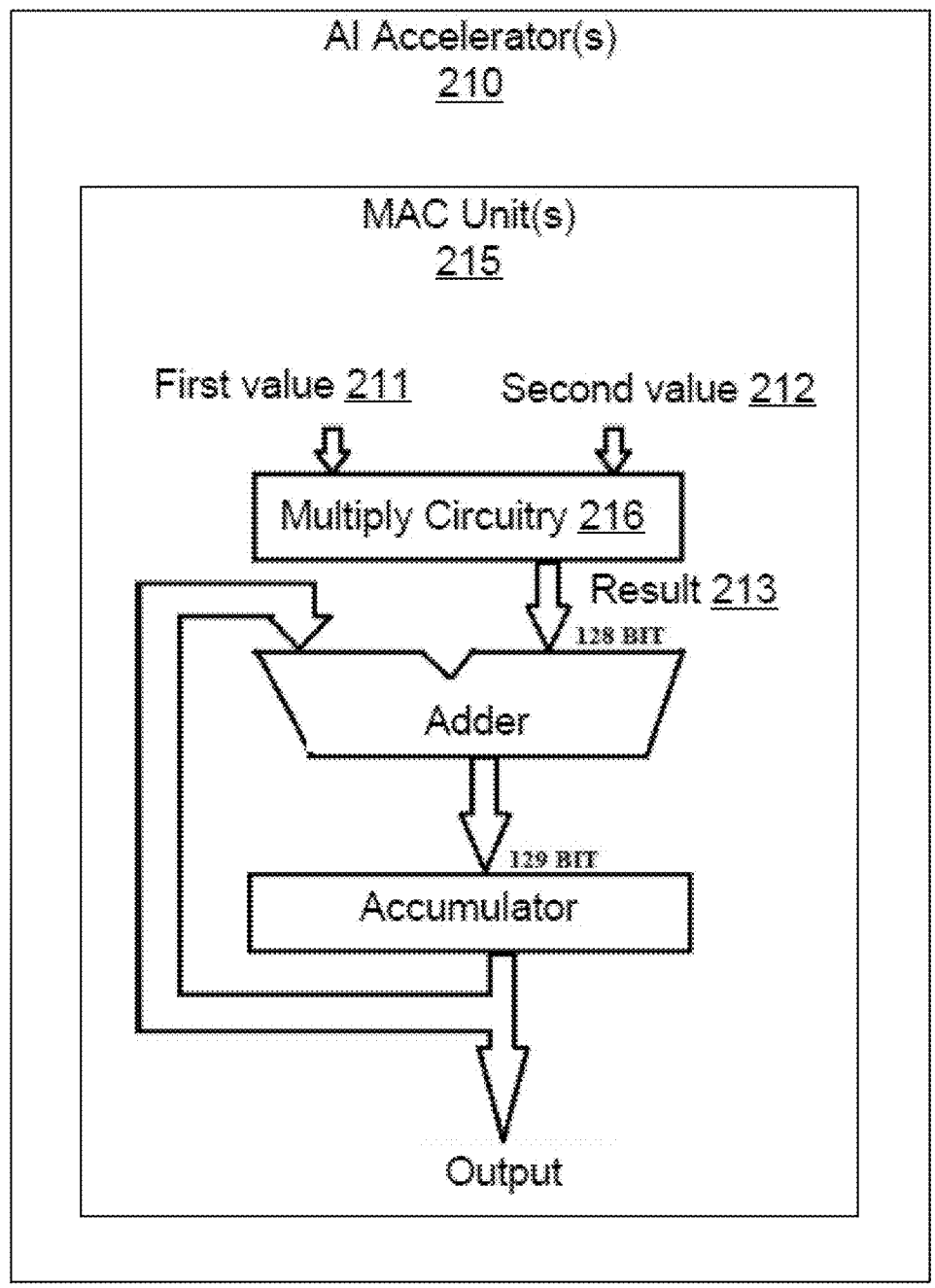
FIG. 2A is a block diagram of an embodiment of a device for performing AI related processing, according to an example implementation of the present disclosure.

FIG. 2A is a block diagram of an embodiment of a device for performing AI related processing, according to an example implementation of the present disclosure. In some embodiments, an AI accelerator 210 may include one or more MAC units 215 configured to perform multiply-accumulate operation(s). The MAC unit 215 can include multiply circuitry 216, an adder circuit and/or an accumulator circuit. The multiply circuitry 216 can receive a first value 211 and a second value 212 as input and provide a multiplication result 213 of the first and second values to the adder circuit. In some embodiments, the first value 211 may be represents a value of one of weight data (e.g., weight values for convolution operations) and activation data (e.g., a value of an activation function) for a first layer of a neural network, and the second value 213 may represent a value of the other of the weight data and the activation data for the first layer of the neural network.

In some embodiments, the MAC unit 215 can perform both multiply and addition functions similar to the MAC unit 140 in FIG. 1C, but in a more energy efficient manner than the MAC unit 140 because the multiply circuitry 216 can perform multiplication with more energy efficient operations (e.g., adder or shift operations) instead of a multiplier operation. The multiply circuitry 216 will be described in detail in the following sections.

Figure 2B:
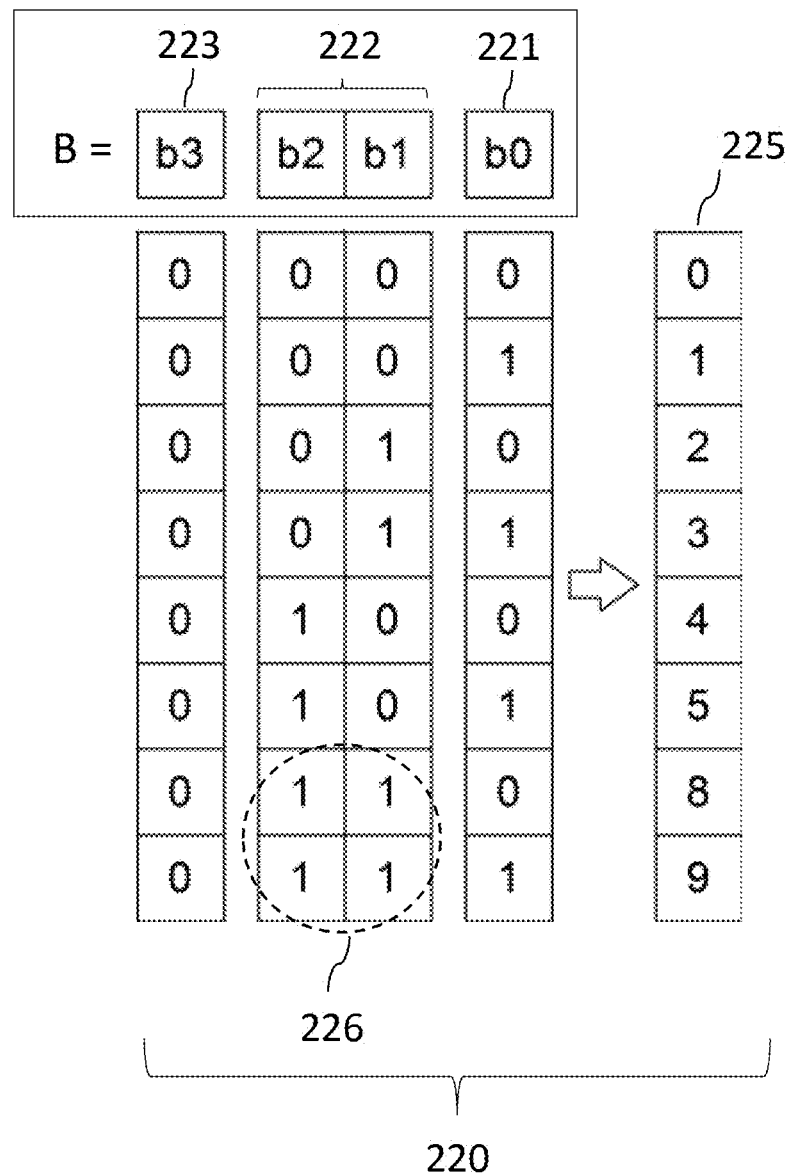
FIG. 2B is a block diagram of an embodiment of an alternative number format for performing AI related processing, according to an example implementation of the present disclosure.

FIG. 2B is a block diagram of an embodiment of an alternative number format for performing AI related processing, according to an example implementation of the present disclosure. Referring to FIG. 2B, in some embodiments, 4-bit data (B) denoted by (b3 b2 b1 b0) has a predetermined format including a first bit 221 (denoted by b0), and two or more second bits 222 (denoted by (b2b1)) to represent a value of zero or $2^n$ where n is an integer greater than or equal to 0, such that B can represent a value b0+2*β where β=$2^n$. In some embodiments, 4-bit data B includes a third bit b3 to represent a sign of the value represented by B. For example, according to this predetermined format, B=(0 1 1 0) includes "0" as the first bit b0, "1 1" as the second bits (b2 b1) to represent $2^2$ (n=2), and "0" to represent a positive sign, thereby representing +8 (=0+2*$2^2$). Also, B=(0 1 1 1) includes "1" as the first bit b0, "1 1" as the second bits (b2 b1) to represent $2^2$ (n=2), and "0" as the third bit b3 to represent a positive sign, thereby representing +9 (=1+2*$2^2$).

FIG. 2B also illustrates a mapping table 220 showing decimal values 225 represented by respective 4-bit data B. As shown in FIG. 2B, 4-bit data B=(0 0 0 0)~(0 1 0 1) in the alternative number format can represent the same values as those in the linear number format, while B=(0 1 1 0) and (0 1 1 1) can represent different values from those in the linear number format (see the circled area 226 in FIG. 2B). Moreover, in some embodiments as shown in FIG. 2B, using the predetermined format described above, the values 6 and 7 are not represented in the alternative number format.

In some embodiments, the alternative number format can define the predetermined format in a different manner than that described above. For example, if as the second bits (b2 b1), "0 1" represents $2^1$ (n=1), "1 0" represents $2^2$ (n=2) and "1 1" represents $2^3$ (n=3), 4-bit data B can represent decimal values 0-1, 4-5, 8-9, 16-17, so that the range of represented values can be extended to 0 to 17 while the values 2-3, 6-7, and 10-15 may not be represented. In some embodiments, the second bits can include more than two bits and the first bit can include more than one bit. For example, the alternative number format can define the predetermined format such that the first bit corresponds to (b1 b0) and the second bits (b4 b3 b2) represent $2^n$.

Figure 2C:
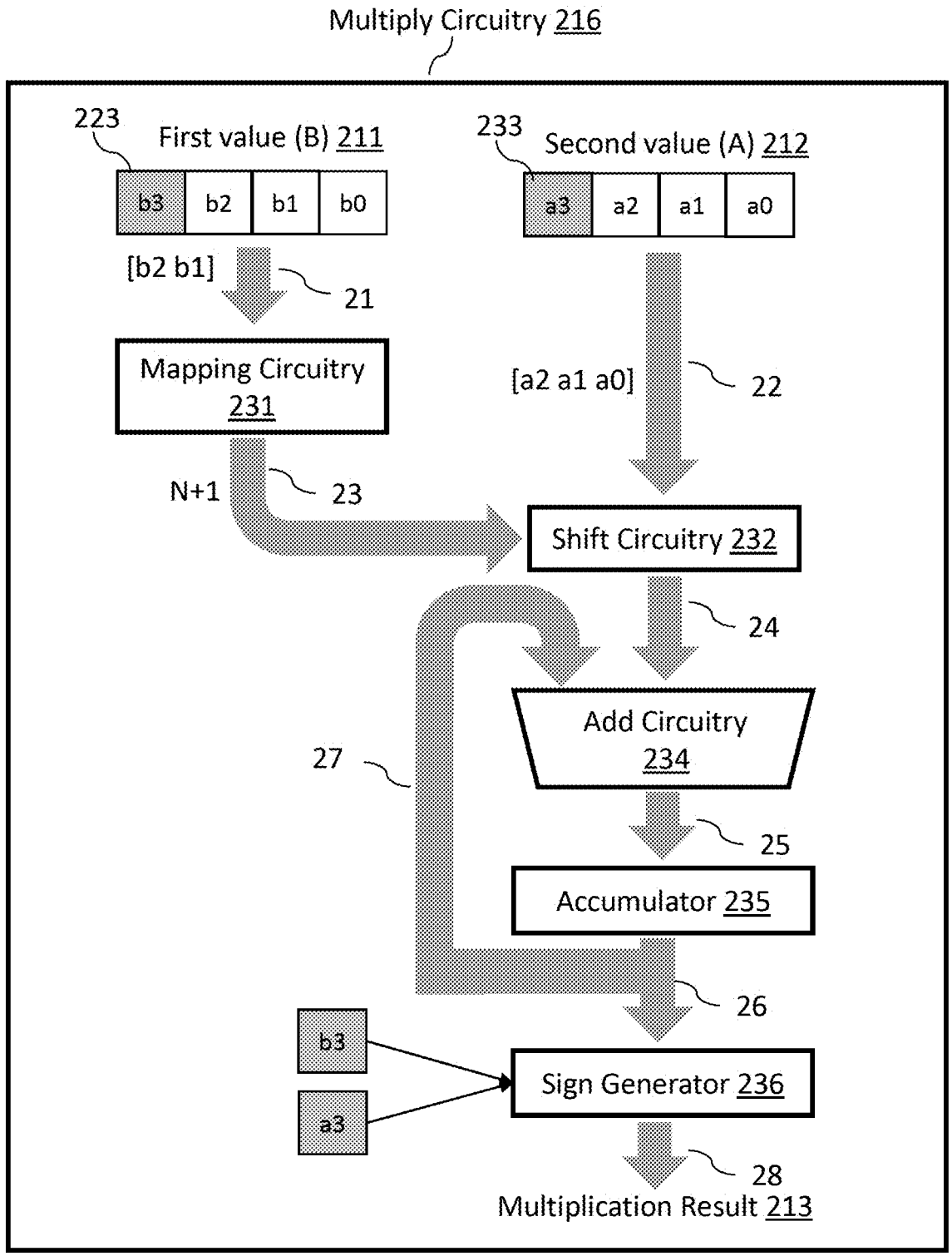
FIG. 2C is a block diagram of an embodiment of circuitry for performing multiplication using an alternative number format, according to an example implementation of the present disclosure.

FIG. 2C is a block diagram of an embodiment of circuitry for performing multiplication using an alternative number format, according to an example implementation of the present disclosure. Referring to FIG. 2C, the multiply circuitry 216 of the accelerator 210 (see FIG. 2A) may include mapping circuitry 231, shift circuitry 232, add circuitry 234, an accumulator 235, and/or a sign generator 236, to perform multiplication operation on the first value 211 in the alternative number format and the second value 212 in the linear number format. In some embodiments, the add circuitry 234 and accumulator 235 may have similar configuration to those of the adder and accumulator shown in FIG. 1C, respectively.

In this example, the first value in the alternative number format is denoted by B including 4 bits (b3 b2 b1 b0) in which b0 is a first bit, (b2 b1) is second bits representing $2^n$ (n is an integer greater than or equal to 0), and b3 is a third bit 223 representing a sign of the first value. With this format, B can represent a value (b0+2*β) where β=$2^n$. The second value in the linear number format is denoted by A including 4 bits (a3 a2 a1 a0) so that A can represent a value (a0+2*a1+4*a2). The multiply circuitry 216 can multiply the first value B and the second value A to provide a multiplication result 213 corresponding to a value (b0+2*β)*(a0+2*a1+4*a2)=b0*(a0+2*a1+4*a2)+$2^{n+1}$*(a0+2*a1+4*a2). The first and second partial products $2^{n+1}$*(a0+2*a1+4*a2) and b0*(a0+2*a1+4*a2) are denoted by pp1 and pp2, respectively.

$$B*A=pp1+pp2=2^{n+1}*(a0+2*a1+4*a2)+b0*(a0+2*a1+4*a2) \quad \text{Equation (1)}$$

For example, if B=(0 1 1 1) and A=(0 1 1 1), according to the mapping shown in FIG. 2B, $\beta=2^n=4$ can be obtained, and the multiply circuitry 216 can provide a multiplication result corresponding to (1+2*4)*(1+2*1+4*1)=63 in decimal form. Now, it will be described how the multiply circuitry 216 can provide a multiplication result in an energy efficient manner using the alternative number format.

In some embodiments, the shift circuitry 232 may be one or more shift register that can shift data to the right direction k times so as to multiply the data by $2^k$. In some embodiments, a shift control input signal of a shift register can determine when and how many times the shift register is shifted. In some embodiments, the shift circuitry 232 may be a barrel shifter that can circularly shift data by a specified number of bits. In some embodiments, the shift circuitry 232 may be a processor similar to the processor 124 in FIG. 1A, which can implement circular shift using built-in bitwise operation.

In some embodiments, the mapping circuitry 231 may be configured to determine whether the value of the second bits (b2 b1) of the first value B is zero. The mapping circuitry 231 may be configured to, in response to a determination that the value of the second bits (b2 b1) is zero, provide the value of zero as the first partial product pp1 (e.g., the first multiplication result).

In some embodiments, in response to determination that the value of the second bits (b2 b1) of the first value B is not zero, the shift circuitry 232 may load or store values of bits (a2 a1 a0) of the second value A (22 in FIG. 2C). The mapping circuitry 231 may be configured to receive a value of the second bits (b2 b1) of the first value B as input (21 in FIG. 2C), obtain an integer n, and generate a shift control input signal during (n+1) cycles to cause the shift circuitry 232 to shift data by (n+1) bits (23 in FIG. 2C). In response to receiving the shift control input signal during (n+1) cycles, the shift circuitry 232 may shift the stored values of bits (a2 a1 a0) by (n+1) bits to output the first partial product pp1=$2^{n+1}$*(a0+2*a1+4*a2) (see Equation 1). For example, if B=(0 1 1 1), the mapping circuitry 231 can receive "1 1" of the second bits (b2 b1) of the first value B as input, obtain n=2, and generate a shift control input signal during (n+1)=3 cycles to be input to the shift circuitry 232, so as to cause the shift circuitry 232 to shift the stored value (a0+2*a1+4*a2) by (n+1) bits, which corresponds to the first partial product pp1=$2^{n+1}$*(a0+2*a1+4*a2).

In some embodiments, the mapping circuitry 231 may be a lookup table similar to the mapping table 220 in FIG. 2B. In some embodiments, the mapping circuitry 231 can search the lookup table based on the values of the second bits (b2 b1) and obtain or retrieve an integer n, and generate the shift control input signal during (n+1) cycles to be input to the shift circuitry. In some embodiments, a processor, e.g., the processor 124 in FIG. 1A, can search the lookup table based on the values of the second bits (b2 b1). In some embodiments, the mapping circuitry 231 may be configured to read a binary number (b2 b1) from B and generate a shift control input signal during (n+1) cycles based on the value of the binary number (b2 b1). For example, if B=(0 1 1 1), the mapping circuitry 231 can generate the shift control input signal during (n+1)=3 cycles based on the value of the binary number ("1 1"), because "11" in binary is equal to "3" in decimal.

In some embodiments, the shift circuitry 232 may be configured to output the shifted value, e.g., the first partial product pp1=$2^{n+1}$*(a0+2*a1+4*a2), to the add circuitry 234 (24 in FIG. 2C). In response to receiving the first partial product pp1, the add circuitry 234 may be configured to add the received first partial product and zero (because no accumulated value exists in the accumulator 235 at this time) and output the added value to the accumulator 235 (25 in FIG. 2C).

Now, the shift circuitry 232 may load or store the values of bits (a2 a1 a0) of the second value A (22 in FIG. 2C). In some embodiments, the multiply circuitry 216 can control the shift circuitry 232 to hold the last value (e.g., by setting "clear bit" low) so as not to load or store again the values of bits (a2 a1 a0) of the second value A. In some embodiments, the multiply circuitry 216 can control the shift circuitry 232 to output the stored values of bits (a2 a1 a0) based on a value of the first bit (b0) of the first value. In some embodiments, the multiply circuitry 216 can control the shift circuitry 232 to selectively output zero (in case the value of b0 is zero) or the stored values of bits (a2 a1 a0) (in case the value of b0 is "1") to the add circuitry 234 (24 in FIG. 2C). In this manner, the shift circuitry 232 can output the second partial product pp2=b0*(a0+2*a1+4*a2) to the add circuitry 234 (24 in FIG. 2C). In response to receiving the second partial product pp2, the add circuitry 234 may be configured to add the received second partial product pp2 and the first partial product pp1 that has been previously received from the accumulator 235 (27 in FIG. 2C), and output the added value (e.g., pp1+pp2) to the accumulator 235 (25 in FIG. 2C). In response to receiving the added value, the accumulator 235 may be configured to output the added value (pp1+pp2) to the sign generator 236. In response to receiving the added value (pp1+pp2), the sign generator 236 may be configured to output, as the multiplication result 213, a positive value of the added value or a negative value of the added value, based on a value 223 of the third bit b3 of the first value B and a value 233 of the third bit a3 of the second value A (28 in FIG. 2C).

The multiply circuitry 216 illustrated in FIG. 2C can perform multiplication of two numbers using the alternative number format so that multiplication of those two numbers can be performed with more energy efficient operations (e.g., adder or shift operations) instead of an multiplier operation. Moreover, in multiplying two 4-bit numbers using the alternative format, the multiply circuitry 216 can perform multiplication with two partial products (e.g., pp1 and pp2 in Equation 1), thereby reducing the maximum number of partial products (and partial product operations) from 3 to 2 compared to the linear number format.

FIG. 2C illustrates multiplication of the first value in the alternative number format and the second value in the signed magnitude format as a linear number format. However, the present disclosure is not limited to the embodiment illustrated in FIG. 2C. Even when the second value is in a different linear number format, e.g., two's complement format or unsigned format, the multiply circuitry 216 can multiply the first value in the alternative number format and the second value in a different linear number format in a similar manner. For example, if the second value is in two's complement format, the output from the accumulator 235 may be in two's complement format, and therefore the sign generator 236 may not only determine a sign of the multiplication result based on the third bit b3 of the first value and the third bit a3 of the second value, but also convert the accumulator output to an appropriate two's complement format according to the result of sign determination. If the second value is in unsigned format, the shift circuitry 232 may store or load values of (a3 a2 a1 a0) instead of (a2 a1 a0) in 22 in FIG. 2C, and the sign generator 236 can determine a sign of the multiplication result only based on the third bit b3 of the first value.

Figure 2D:
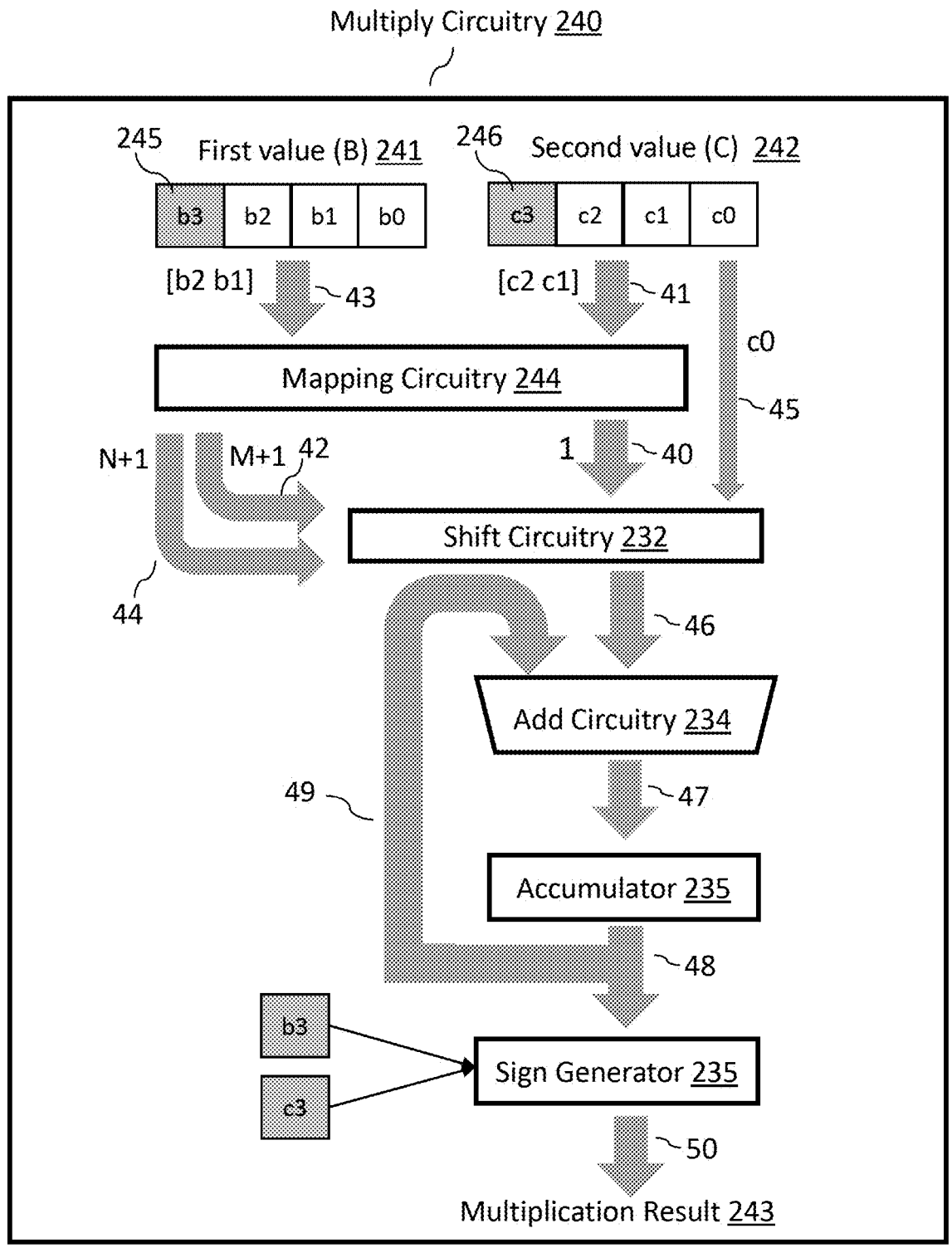
FIG. 2D is a block diagram of another embodiment of circuitry for performing multiplication using an alternative number format, according to an example implementation of the present disclosure.

FIG. 2D is a block diagram of another embodiment of circuitry for performing multiplication using an alternative number format, according to an example implementation of the present disclosure. Referring to FIG. 2D, a multiply circuitry 240 may have the same configuration as the multiply circuitry 216 in FIG. 2C except for (1) performing multiplication operation on the first value 241 and the second value 242, both of which are in the alternative number format, and thus (2) mapping circuitry 244 configured to not only map values of second bits of a first value 241 to an integer but also map values of second bits of a second value 242 to an integer.

In this example in FIG. 2D, the first value 241 has the alternative number format and is denoted by B including 4 bits (b3 b2 b1 b0) in which b0 is a first bit, (b2 b1) is second bits representing $2^n$ (n is an integer greater than or equal to 0), and b3 is a third bit representing a sign of the first value 241. With this format, B can represent a value (b0+2*β) where β=$2^n$. The second value 242 also has the alternative number format and is denoted by C including 4 bits (c3 c2 c1 c0) in which c0 is a first bit, (c2 c1) is second bits representing $2^m$ (m is an integer greater than or equal to 0), and c3 is a third bit representing a sign of the second value 242. With this format, C can represent a value (c0+2*γ) where γ=$2^m$. The multiply circuitry 240 can multiply the first value B and the second value C to provide a multiplication result 243 corresponding to a value (b0+2*β)*(c0+2*γ)= b0*c0+b0*$2^{m+1}$+c0*$2^{n+1}$+$2^{n+1}$*$2^{m+1}$. The product terms $2^{n+1}$*$2^{m+1}$, c0*$2^{n+1}$, b0*$2^{m+1}$ and b0*c0 are denoted by pt1, pt2, pt3, and pt4, respectively.

$$B*C=pt1+pt2+pt3+pt4=2^{n+1}*2^{m+1}+c0*2^{n+1}+b0*2^{m+1}+b0*c0 \qquad \text{Equation (2)}$$

For example, if B=(0 1 1 1) and C=(0 1 1 1), according to the mapping shown in FIG. 2B, β=$2^n$=4 and γ=$2^m$=4 can be obtained (m=n=2), and the multiply circuitry 240 can provide a multiplication result corresponding to ($2^3$*$2^3$+1*$2^3$+1*$2^3$+1*1)=81 in decimal form. Now, it will be described how the multiply circuitry 240 can provide a multiplication result in an energy efficient manner using the alternative number format.

In some embodiments, the shift circuitry 232 may load or store a value of one ("1") (40 in FIG. 2D). The mapping circuitry 244 may be configured to receive a value of the second bits (c2 c1) of the second value C as input (41 in FIG. 2D), obtain an integer m, and generate a shift control input signal during (m+1) cycles to cause the shift circuitry 232 to shift data (e.g., "1") by (m+1) bits (42 in FIG. 2D). In response to receiving the shift control input signal during (m+1) cycles, the shift circuitry 232 may shift the stored values (e.g., "1") by (m+1) bits to hold $2^{m+1}$ therein. Then, the mapping circuitry 244 may be configured to receive a value of the second bits (b2 b1) of the first value B as input (43 in FIG. 2D), obtain an integer n, and generate a shift control input signal during (n+1) cycles to cause the shift circuitry 232 to shift the stored data (e.g., $2^{m+1}$) by (n+1) bits (44 in FIG. 2D). In response to receiving the shift control input signal during (n+1) cycles, the shift circuitry 232 may shift the stored values (e.g., $2^{m+1}$) by (n+1) bits to output $2^{n+1}$*$2^{m+1}$ which corresponds to the product term pt1, to the add circuitry 234 (46 in FIG. 2D). For example, if B=(0 1 1 1) and C=(0 1 1 1), the mapping circuitry 244 can obtain m=n=2 and generate corresponding shift control input signals so that the shift circuitry 232 can shift the stored values (e.g., "1") by (m+1)=3 bits initially and by (n+1)=3 bits subsequently, to output $2^{n+1}$*$2^{m+1}$ (=64) which corresponds to the product term pt1, to the add circuitry 234.

In some embodiments, the shift circuitry 232 may be configured to output the shifted value, e.g., the product term pt1=$2^{n+1}$*$2^{m+1}$, to the add circuitry 234 (46 in FIG. 2D). In response to receiving the first product term pt1, the add circuitry 234 may be configured to add the received first product term and zero (because no accumulated value exists in the accumulator 235 at this time) and output the added value to the accumulator 235 (47 in FIG. 2D).

In some embodiments, the shift circuitry 232 may load or store the value of the first bit c0 of the second value C (45 in FIG. 2D). Then, the mapping circuitry 244 may be configured to receive a value of the second bits (b2 b1) of the first value B as input (43 in FIG. 2D), obtain an integer n, and generate a shift control input signal during (n+1) cycles to cause the shift circuitry 232 to shift the stored data (e.g., the value of the first bit c0) by (n+1) bits (44 in FIG. 2D). In some embodiments, the mapping circuitry 244 can hold the last value output to the shift circuitry 232 (e.g., (n+1) here) so as not to receive the value of the second bits (b2 b1) and obtain the integer n. In response to receiving the shift control input signal during (n+1) cycles, the shift circuitry 232 may shift the stored values (e.g., the value of the first bit c0) by (n+1) bits to output c0*$2^{n+1}$ which corresponds to the product term pt2, to the add circuitry 234 (46 in FIG. 2D). In response to receiving the product term pt2, the add circuitry 234 may be configured to add the received product term pt2 and the product term pt1 that has been previously received from the accumulator 235 (49 in FIG. 2D), and output the added value (e.g., pt1+pt2) to the accumulator 235 (47 in FIG. 2C).

In some embodiments, the shift circuitry 232 may load or store a value of one ("1") (40 in FIG. 2D). The mapping circuitry 231 may be configured to receive a value of the second bits (c2 c1) of the second value C as input (41 in FIG. 2D), obtain an integer m, and generate a shift control input signal during (m+1) cycles to cause the shift circuitry 232 to shift data (e.g., "1") by (m+1) bits (42 in FIG. 2D). In response to receiving the shift control input signal during (m+1) cycles, the shift circuitry 232 may shift the stored values e.g., "1") by (m+1) bits to hold $2^{m+1}$ therein. In some embodiments, the multiply circuitry 240 can control the shift circuitry 232 to output the stored value of $2^{m+1}$ based on a value of the first bit (b0) of the first value. In some embodiments, the multiply circuitry 240 can control the shift circuitry 232 to selectively output zero (in case the value of b0 is zero) or the stored value of $2^{m+1}$ (in case the value of b0 is "1") to the add circuitry 234 (46 in FIG. 2C). In this manner, the shift circuitry 232 can output the product term pt3=b0*$2^{m+1}$ to the add circuitry 234 (46 in FIG. 2D). In response to receiving the product term pt3, the add circuitry 234 may be configured to add the received product term pt3 and the added value (pt1+pt2) that has been previously received from the accumulator 235 (49 in FIG. 2D), and output a newly added value (e.g., pt1+pt2+pt3) to the accumulator 235 (47 in FIG. 2C).

In some embodiments, the shift circuitry 232 may load or store the value of the first bit c0 of the second value C (45 in FIG. 2D). In some embodiments, the multiply circuitry 240 can control the shift circuitry 232 to output the stored value of the first bit c0 based on the value of the first bit (b0) of the first value. In some embodiments, the multiply circuitry 240 can control the shift circuitry 232 to selectively output zero (in case the value of b0 is zero) or the stored the value of the first bit c0 (in case the value of b0 is "1") to the add circuitry 234 (46 in FIG. 2C). In this manner, the shift circuitry 232 can output the product term pt4=b0*c0 to the add circuitry 234 (46 in FIG. 2D). In response to receiving the product term pt4, the add circuitry 234 may be configured to add the received product term pt4 and the previous added value (pt1+pt2+pt3) that has been previously received from the accumulator 235 (49 in FIG. 2D), and output a newly added value (e.g., pt1+pt2+pt3+pt4) to the accumulator 235 (47 in FIG. 2C).

In some embodiments, in response to receiving the added value, the accumulator 235 may be configured to output the added value (pt1+pt2+pt3+pt4) to the sign generator 236. In response to receiving the added value (pt1+pt2+pt3+pt4), the sign generator 236 may be configured to output, as the multiplication result 243, a positive value of the added value or a negative value of the added value, based on a value 245 of the third bit b3 of the first value B and a value 246 of the third bit a3 of the second value A (50 in FIG. 2D).

The multiply circuitry 240 illustrated in FIG. 2D can perform multiplication of two numbers that are in the alternative number format so that multiplication of those two numbers can be performed with more energy efficient operations (e.g., adder or shift operations) instead of an multiplier operation. Moreover, in multiplying two 4-bit numbers both in the alternative format, the multiply circuitry 216 can perform multiplication with four product terms (e.g., pt1, pt2, pt3 and pt4 in Equation 2), thereby reducing the maximum number of product terms (and product operations) from 6 to 4 compared to the case in which both numbers are in the linear number format.

In some embodiments of the present disclosure, a device (e.g., the AI accelerator 210 in FIG. 2A) includes circuit (e.g., the multiply circuitry 216 or 240 in FIGS. 2A, 2C and 2D) including shift circuitry (e.g., the shift circuitry 232 in FIGS. 2C and 2D) and add circuitry (e.g., the add circuitry 234 in FIGS. 2C and 2D) for performing multiplication of a first value (e.g., the first value 211 or 241 in FIGS. 2C and 2D) and a second value (e.g., the second value 212 or 242 in FIGS. 2C and 2D) for a neural network. The first value may have a predetermined format including a first bit (e.g., b0 in FIGS. 2C and 2D), and two or more second bits to represent a value of zero or $2^n$ (see the mapping table 226 in FIG. 2B) where n is an integer greater than or equal to 0 (e.g., (b2 b1) mapped to $2^2$ (n=2) if B=(0 1 1 1) in FIGS. 2C and 2D). The circuitry may be configured to shift, when the two or more second bits represent the value of $2^n$, the second value (e.g., a value of (a2 a1 a0) in FIG. 2C) by (n+1) bits via the shift circuitry to provide a first multiplication result (e.g., the first partial product pp1 in Equation 1). The circuitry may be configured to, based on a value of the first bit of the first value (e.g., b0 in FIGS. 2C and 2D), selectively output zero or the second value (e.g., the value of (a2 a1 a0) in FIG. 2C) to provide a second multiplication result (e.g., the second partial product pp2 in Equation 1). The circuitry may be configured to add the first multiplication result and the second multiplication result via the add circuitry (e.g., the add circuitry 234 and the accumulator 235 in FIGS. 2C and 2D) to provide a result of the multiplication of the first value and the second value (e.g., the multiplication result 213 in FIG. 2C).

In some embodiments, "1 1" as the two or more second bits of the first value may represent a value of 4. For example, if 4-bit data B in the alternative number format is (0 1 1 1), "1 1" as the second bits represents 4 ($=2^2$, n=2) so that B is mapped to b0+2*$2^2$=9 (see also the mapping table 220 in FIG. 2B). In some embodiments, the first bit of the first value may be a least significant bit (LSB) of the first value. For example, as shown in FIG. 2B, the first bit b0 of 4-bit data B is an LSB. In some embodiments, the first value may further include a third bit (e.g., the third bit b3 in FIG. 2B) to indicate that the first value is signed or unsigned (e.g., the value 223 of the third bit b3 is a sign bit of B in FIG. 2B). In some embodiments, the circuitry (e.g., the sign generator 236 in FIG. 2C) may be configured to determine a sign of the result of the multiplication of the first value and the second value (e.g., the multiplication result 213) based on a value of the third bit of the first value (e.g., based on the value 223 of the third bit b3 in FIG. 2C).

In some embodiments, the circuitry may be configured to provide, when the two or more second bits represent the value of zero, the value of zero as the first multiplication result. For example, referring to FIG. 2C, the mapping circuitry 231 may be configured to determine whether the value of the second bits (b2 b1) of the first value B is zero. The mapping circuitry 231 may be configured to, in response to determination that the value of the second bits (b2 b1) is zero, provide the value of zero as the first partial product pp1 (e.g., the first multiplication result). In some embodiments, in response to determination that the value of the second bits (b2 b1) of the first value B is not zero, the shift circuitry 232 may load or store values of bits (a2 a1 a0) of the second value A (22 in FIG. 2C). In some embodiments, the second value may use a linear number format to represent a binary number (e.g., the second value A is in signed magnitude format in FIG. 2C).

In some embodiments, the second value (e.g., the second value C in FIG. 2D) may have the predetermined format comprising a first bit (e.g., the first bit c0 in FIG. 2D), and two or more second bits (e.g., the second bits (c2 c1) in FIG. 2D) to represent a value of zero or $2^m$ where m is an integer greater than or equal to zero (e.g., if C=(0 1 1 1), the second bits (c2 c1) represent $4=2^2$, m=2). In some embodiments, the circuitry (e.g., the multiply circuitry 240 in FIG. 2D) may be further configured to, when the two or more second bits of the first value represent the value of $2^n$ (e.g., the second bits (b2 b1) of the first value B represent $4=2^2$, n=2) and the two or more second bits of the second value represent the value of $2^m$ (e.g., the second bits (c2 c1) of the second value C represent $4=2^2$, m=2), shift the value of $2^{m+1}$ by (n+1) bits via the shift circuitry (e.g., the shift circuitry 232 in FIG. 2D) to provide a third multiplication result (e.g., the product term $pt1=2^{n+1}*2^{m+1}$ in Equation (2)). The circuitry may be further configured to, based on a value of the first bit of the second value (e.g., the first bit c0 of the second value C in FIG. 2D), selectively output zero or the value of $2^{n+1}$ to provide a fourth multiplication result (e.g., the product term $pt2=c0*2^{n+1}$ in Equation (2)). The circuitry may be further configured to, based on the value of the first bit of the first value (e.g., the first bit b0 of the first value B in FIG. 2D), selectively output zero or the value of $2^{m+1}$ to provide a fifth multiplication result (e.g., the product term $pt3=b0*2^{m+1}$ in Equation (2)). The circuitry may be further configured to, based on the value of the first bit of the first value (e.g., the first bit b0 of the first value B in FIG. 2D), selectively output zero or the value of the first bit of the second value (e.g., the first bit c0 of the second value C in FIG. 2D) to provide a sixth multiplication result (e.g., the product term pt4=b0*c0 in Equation (2)). The circuitry may be further configured to add the third to sixth multiplication results (e.g., pt1+pt2+pt3+pt4 in Equation (2)) via the add circuitry (e.g., the add circuitry 234 and accumulator 235 in FIG. 2D) to provide a result of the multiplication of the first value and the second value (e.g., the multiplication result 243 in FIG. 2D).

In some embodiments, the circuitry (e.g., the MAC unit 140) may be further configured to perform convolution for a first layer of the neural network using weight data (e.g., weight values to perform convolution operations on input data and weight values) and activation data representing an activation function (e.g., a value of an activation function in a layer of a neural network), and the first value (e.g., the first value 211 or 241 in FIGS. 2A, 2C and 2D) may represent a value of one of the weight data and the activation data for the first layer of the neural network. In some embodiments, the second value (e.g., the second value 212 or 242 in FIGS. 2A, 2C and 2D) may represent a value of the other of the weight data and the activation data for the first layer of the neural network.

FIG. 2E is a flow chart illustrating a method for performing multiplication using an alternative number format, according to an example implementation of the present disclosure. In brief overview, the method includes shifting, by shift circuitry, when two or more second bits represent a value of $2^n$, a second value by (n+1) bits to provide a first multiplication result (251). The method can include selectively outputting zero or the second value to provide a second multiplication result based on a value of a first bit of a first value (252). The method can include adding, by add circuitry, the first multiplication result and the second multiplication result to provide a result of multiplication of the first value and the second value (253).

The method includes performing multiplication of a first value (e.g., the first value 211 or 241 in FIGS. 2C and 2D) and a second value (e.g., the second value 212 or 242 in FIGS. 2C and 2D) for a neural network. In some embodiments, the first value has a predetermined format comprising a first bit (e.g., b0 in FIGS. 2C and 2D), and two or more second bits to represent a value of zero or $2^n$ where n is an integer greater than or equal to 0 (e.g., (b2 b1) mapped to $2^2$ (n=2) if B=(0 1 1 1) in FIGS. 2C and 2D).

In further details of 251, and in some embodiments, circuitry (e.g., the multiply circuitry 216 or 240 in FIGS. 2A, 2C and 2D) of a device (e.g., the AI accelerator 210 in FIG. 2A) may shift, when the two or more second bits represent the value of $2^n$ (e.g., (b2 b1) mapped to $2^2$ (n=2) if B=(0 1 1 1) in FIGS. 2C and 2D), the second value (e.g., a value of (a2 a1 a0) in FIG. 2C) by (n+1) bits via the shift circuitry (e.g., the shift circuitry 232 in FIGS. 2C and 2D) to provide a first multiplication result (e.g., the first partial product pp1=$2^{n+1}$*(a0+2*a1+4*a2) in Equation 1). In some embodiments, the first bit of the first value may be a least significant bit (LSB) of the first value. For example, as shown in FIG. 2B, the first bit b0 of 4-bit data B is an LSB. In some embodiments, "1 1" as the two or more second bits of the first value may represent a value of 4. For example, if 4-bit data B in the alternative number format is (0 1 1 1), "1 1" as the second bits represents 4 (=$2^2$, n=2) so that B is mapped to b0+2*$2^2$=9 (see also the mapping table 220 in FIG. 2B). In some embodiments, the second value may use a linear number format to represent a binary number.

In some embodiments, the circuitry may be configured to provide, when the two or more second bits represent the value of zero, the value of zero as the first multiplication result. For example, referring to FIG. 2C, the mapping circuitry 231 may be configured to determine whether the value of the second bits (b2 b1) of the first value B is zero. The mapping circuitry 231 may be configured to, in response to determination that the value of the second bits (b2 b1) is zero, provide the value of zero as the first partial product pp1 (e.g., the first multiplication result). In some embodiments, in response to determination that the value of the second bits (b2 b1) of the first value B is not zero, the shift circuitry 232 may load or store values of bits (a2 a1 a0) of the second value A (22 in FIG. 2C). In some embodiments, the second value may use a linear number format to represent a binary number (e.g., the second value A is in signed magnitude format in FIG. 2C).

In further details of 252, and in some embodiments, the circuitry may be configured to, based on a value of the first bit of the first value (e.g., b0 in FIGS. 2C and 2D), selectively output zero or the second value (e.g., the value of (a2 a1 a0) in FIG. 2C) to provide a second multiplication result (e.g., the second partial product pp2=b0*(a0+2*a1+4*a2) in Equation 1).

In further details of 253, and in some embodiments, the circuitry may be configured to add the first multiplication result (e.g., the second partial product pp1 in Equation 1) and the second multiplication result (e.g., the second partial product pp2 in Equation 1) via the add circuitry (e.g., the add circuitry 234 and the accumulator 235 in FIGS. 2C and 2D) to provide a result of the multiplication of the first value and the second value (e.g., the multiplication result 213 in FIG. 2C).

In some embodiments, the first value may further include a third bit (e.g., the third bit b3 in FIG. 2B) to indicate that the first value is signed or unsigned (e.g., the value 223 of the third bit b3 is a sign bit of B in FIG. 2B). In some embodiments, the circuitry may be configured to determine a sign of the result of the multiplication of the first value and the second value (e.g., the multiplication result 213) based on a value of the third bit of the first value (e.g., based on the value 223 of the third bit b3 in FIG. 2C).

In some embodiments, the circuitry (e.g., the MAC unit 140) may be further configured to perform convolution for a first layer of the neural network using weight data (e.g., weight values to perform convolution operations on input data and weight values) and activation data representing an activation function (e.g., a value of an activation function in a layer of a neural network), and the first value (e.g., the first value 211 or 241 in FIGS. 2A, 2C and 2D) may represent a value of one of the weight data and the activation data for the first layer of the neural network. In some embodiments, the second value (e.g., the second value 212 or 242 in FIGS. 2A, 2C and 2D) may represent a value of the other of the weight data and the activation data for the first layer of the neural network.

FIG. 2F is a flow chart illustrating a method for performing multiplication using an alternative number format, according to another example implementation of the present disclosure. In brief overview, the method includes shifting by shift circuitry, when two or more second bits of a first value represent a value of $2^n$ and two or more second bits of a second value represent a value of $2^m$, a value of $2^{m+1}$ by (n+1) bits to provide a third multiplication result (261). The method can include selectively outputting zero or the value of $2^{n+1}$ to provide a fourth multiplication result based on a value of a first bit of the second value (262). The method can include selectively outputting zero or the value of $2^{m+1}$ to provide a fifth multiplication result based on a value of a first bit of the first value (263). The method can include selectively outputting zero or a value of a first bit of the second value to provide a sixth multiplication result based on the value of the first bit of the first value (264). The method can include adding, by add circuitry, the third to sixth multiplication results to provide a result of the multiplication of the first value and the second value (265).

In some embodiments, the second value (e.g., the second value C in FIG. 2D) may have the predetermined format comprising a first bit (e.g., the first bit c0 in FIG. 2D), and two or more second bits (e.g., the second bits (c2 c1) in FIG. 2D) to represent a value of zero or $2^m$ where m is an integer greater than or equal to zero. For example, if the second value C=(0 1 1 1), the second bits (c2 c1) represent $4=2^2$, m=2.

In further details of 261, and in some embodiments, circuitry (e.g., the multiply circuitry 240 in FIG. 2D) of a device (e.g., the MAC unit 215 in FIG. 2A) may shift, when the two or more second bits of the first value represent the value of $2^n$ (e.g., the second bits (b2 b1) of the first value B represent $4=2^2$, n=2) and the two or more second bits of the second value represent the value of $2^m$ (e.g., the second bits (c2 c1) of the second value C represent $4=2^2$, m=2), the value of $2^{m+1}$ by (n+1) bits via the shift circuitry (e.g., the shift circuitry 232 in FIG. 2D) to provide a third multiplication result (e.g., the product term $pt1=2^{n+1}*2^{m+1}$ in Equation (2)). For example, referring to FIG. 2D, if the first value B=(0 1 1 1) and the second value C=(0 1 1 1), the multiply circuitry 240 may shift, when the second bits (1 1) of the first value B represents $4=2^2$ (n=2) and the second bits (1 1) of the second value C represents $4=2^2$ (m=2), the value of $2^3$ by 3 bits via the shift circuitry 232 to provide $2^{n+1}*2^{m+1}=64$ as the third multiplication result.

In further details of 262, and in some embodiments, the circuitry (e.g., the multiply circuitry 240 in FIG. 2D) may selectively output zero or the value of $2^{n+1}$ to provide a fourth multiplication result (e.g., the product term $pt2=c0*2^{n+1}$ in Equation (2)) based on a value of the first bit of the second value (e.g., the first bit c0 of the second value C in FIG. 2D). For example, referring to FIG. 2D, if the first value B=(0 1 1 1) and the second value C=(0 1 1 1), the multiply circuitry 240 may selectively output zero or $2^3$ to provide $c0*2^{n+1}=8$ as the fourth multiplication result.

In further details of 263, and in some embodiments, the circuitry (e.g., the multiply circuitry 240 in FIG. 2D) may selectively output zero or the value of $2^{m+1}$ to provide a fifth multiplication result (e.g., the product term $pt3=b0*2^{m+1}$ in Equation (2)) based on the value of the first bit of the first value (e.g., the first bit b0 of the first value B in FIG. 2D). For example, if the first value B=(0 1 1 1) and the second value C=(0 1 1 1), the multiply circuitry 240 may selectively output zero or $2^3$ to provide $b0*2^{m+1}=8$ as the fifth multiplication result.

In further details of 264, and in some embodiments, the circuitry may selectively outputs zero or the value of the first bit of the second value (e.g., the first bit c0 of the second value C in FIG. 2D) to provide a sixth multiplication result (e.g., the product term pt4=b0*c0 in Equation (2)) based on the value of the first bit of the first value (e.g., the first bit b0 of the first value B in FIG. 2D). For example, if the first value B=(0 1 1 1) and the second value C=(0 1 1 1), the multiply circuitry 240 may selectively output zero or 1 to provide b0*c0=1 as the sixth multiplication result.

In further details of 265, and in some embodiments, the circuitry may add the third to sixth multiplication results (e.g., pt1+pt2+pt3+pt4 in Equation (2)) via the add circuitry (e.g., the add circuitry 234 and accumulator 235 in FIG. 2D) to provide a result of the multiplication of the first value and the second value (e.g., the multiplication result 243 in FIG. 2D). For example, if the first value B=(0 1 1 1) and the second value C=(0 1 1 1), the multiply circuitry 240 may add pt1 (=64), pt2 (=8), pt3 (=8) and pt4 (=1) to provide 81(=64+8+8+1) as a result of the multiplication of the first value B and the second value C.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
   circuitry comprising shift circuitry and add circuitry for performing multiplication of a first value and a second value for a neural network, the first value having a predetermined format comprising a first bit, and two or more second bits to represent a value of zero or $2^n$ wherein n is an integer greater than or equal to 0, the circuitry configured to:
   when the two or more second bits represent the value of $2^n$, shift the second value by (n+1) bits via the shift circuitry to provide a first multiplication result,
   based on a value of the first bit of the first value, selectively output zero or the second value to provide a second multiplication result, and
   add the first multiplication result and the second multiplication result via the add circuitry to provide a result of the multiplication of the first value and the second value.

2. The device according to claim 1, wherein the first bit of the first value is a least significant bit of the first value.

3. The device according to claim 1, wherein the circuitry is configured to provide, when the two or more second bits represent the value of zero, the value of zero as the first multiplication result.

4. The device according to claim 1, wherein the second value uses a linear number format to represent a binary number.

5. The device according to claim 1, wherein:
   the second value has the predetermined format comprising a first bit, and two or more second bits to represent a value of zero or $2^m$ wherein m is an integer greater than or equal to zero, the circuitry is further configured to:

when the two or more second bits of the first value represent the value of $2^n$ and the two or more second bits of the second value represent the value of $2^m$, shift the value of $2^{m+1}$ by (n+1) bits via the shift circuitry to provide a third multiplication result, based on a value of the first bit of the second value, selectively output zero or the value of $2^{n+1}$ to provide a fourth multiplication result, based on the value of the first bit of the first value, selectively output zero or the value of $2^{m+1}$ to provide a fifth multiplication result, based on the value of the first bit of the first value, selectively output zero or the value of the first bit of the second value to provide a sixth multiplication result, and add the third to sixth multiplication results via the add circuitry to provide a result of the multiplication of the first value and the second value.

6. The device according to claim 1, wherein "1 1" as the two or more second bits of the first value represents a value of 4.

7. The device according to claim 1, wherein the first value further comprises a third bit to indicate that the first value is signed or unsigned.

8. The device according to claim 7, wherein the circuitry is configured to determine a sign of the result of the multiplication of the first value and the second value based on a value of the third bit of the first value.

9. The device according to claim 1, wherein:
the circuitry is further configured to perform convolution for a first layer of the neural network using weight data and activation data representing an activation function, and
the first value represents a value of one of the weight data and the activation data for the first layer of the neural network.

10. The device according to claim 9, wherein the second value represents a value of the other of the weight data and the activation data for the first layer of the neural network.

11. A method comprising:
performing multiplication of a first value and a second value for a neural network, the first value having a predetermined format comprising a first bit, and two or more second bits to represent a value of zero or $2^n$ wherein n is an integer greater than or equal to 0,
wherein performing the multiplication of the first value and the second value comprises:
when the two or more second bits represent the value of $2^n$, shifting, by shift circuitry, the second value by (n+1) bits to provide a first multiplication result,
based on a value of the first bit of the first value, selectively outputting zero or the second value to provide a second multiplication result, and
adding, by add circuitry, the first multiplication result and the second multiplication result to provide a result of the multiplication of the first value and the second value.

12. The method according to claim 11, wherein the first bit of the first value is a least significant bit of the first value.

13. The method according to claim 11, wherein performing the multiplication of the first value and the second value comprises:
providing, when the two or more second bits represent the value of zero, the value of zero as the first multiplication result.

14. The method according to claim 11, wherein the second value uses a linear number format to represent a binary number.

15. The method according to claim 11, wherein:
the second value has the predetermined format comprising a first bit, and two or more second bits to represent a value of zero or $2^m$ wherein m is an integer greater than or equal to zero, and
performing the multiplication of the first value and the second value further comprises:
when the two or more second bits of the first value represent the value of $2^n$ and the two or more second bits of the second value represent the value of $2^m$, shifting, by the shift circuitry, the value of $2^{m+1}$ by (n+1) bits to provide a third multiplication result,
based on a value of the first bit of the second value, selectively outputting zero or the value of $2^{n+1}$ to provide a fourth multiplication result,
based on the value of the first bit of the first value, selectively outputting zero or the value of $2^{m+1}$ to provide a fifth multiplication result,
based on the value of the first bit of the first value, selectively outputting zero or the value of the first bit of the second value to provide a sixth multiplication result, and
adding, by the add circuitry, the third to sixth multiplication results to provide a result of the multiplication of the first value and the second value.

16. The method according to claim 11, wherein "1 1" as the two or more second bits of the first value represents a value of 4.

17. The method according to claim 11, wherein the first value further comprises a third bit to indicate that the first value is signed or unsigned.

18. The method according to claim 17, wherein performing the multiplication of the first value and the second value further comprises:
determining a sign of the result of the multiplication of the first value and the second value based on a value of the third bit of the first value.

19. The method according to claim 11, further comprising:
performing convolution for a first layer of the neural network using weight data and activation data representing an activation function,
wherein the first value represents a value of one of the weight data and the activation data for the first layer of the neural network.

20. The method according to claim 19, wherein the second value represents a value of the other of the weight data and the activation data for the first layer of the neural network.

* * * * *